(12) United States Patent
Avraham et al.

(10) Patent No.: US 10,691,568 B2
(45) Date of Patent: Jun. 23, 2020

(54) CONTAINER REPLICATION AND FAILOVER ORCHESTRATION IN DISTRIBUTED COMPUTING ENVIRONMENTS

(71) Applicant: INTERNATIONAL BUSINESS MACHINES CORPORATION, Armonk, NY (US)

(72) Inventors: Amalia Avraham, Petach Tikva (IL); Alon Marx, Matan (IL); Isaac Beckman, Lehavim (IL); Ran Harel, Kfar-Saba (IL); Samuel Krikler, Herzelia (IL); Shay Berman, Modlin (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 147 days.

(21) Appl. No.: 16/046,827

(22) Filed: Jul. 26, 2018

(65) Prior Publication Data
US 2020/0034258 A1    Jan. 30, 2020

(51) Int. Cl.
*G06F 11/00*    (2006.01)
*G06F 11/20*    (2006.01)

(52) U.S. Cl.
CPC .... *G06F 11/2094* (2013.01); *G06F 2201/805* (2013.01); *G06F 2201/82* (2013.01)

(58) Field of Classification Search
CPC .......................................... G06F 11/2056–2094
See application file for complete search history.

(56) References Cited

U.S. PATENT DOCUMENTS

| 7,653,668 | B1 | 1/2010 | Shelat et al. | |
| 8,713,282 | B1 | 4/2014 | Rajimwale et al. | |
| 9,594,822 | B1 | 3/2017 | Natanzon et al. | |
| 9,798,486 | B1 | 10/2017 | Singh | |
| 10,191,778 | B1* | 1/2019 | Yang | G06F 9/45558 |
| 2005/0114730 | A1* | 5/2005 | Iwamura | G06F 11/2069 714/13 |
| 2016/0239396 | A1 | 8/2016 | Deng et al. | |
| 2018/0173554 | A1* | 6/2018 | CaraDonna | G06F 9/45558 |
| 2019/0220361 | A1* | 7/2019 | Mageswaran | G06F 11/2094 |

OTHER PUBLICATIONS

Creating a Persistent Volume Claim, Oracle Cloud Infrastructure Documentation, Oracle Cloud, 2020 (Year: 2020).*
Persistent Volumes, https://kubernetes.io/docs/concepts/storage/persistent-volumes/, The Linux Foundation, 2020 (Year: 2020).*

* cited by examiner

*Primary Examiner* — Michael Maskulinski
(74) *Attorney, Agent, or Firm* — Griffiths & Seaton PLLC

(57) ABSTRACT

Embodiments for managing volume replication and disaster recovery in a containerized storage environment. A mapping is established between a PersistentVolumeClaim (PVC) having a correlated Persistent Volume (PV), and a source storage World Wide Name (WWN) and a target storage WWN. The mapping is replicated as part of a replication operation between the source storage and the target storage thereby maintaining consistency of the PV associated with one or more application containers among the source storage and the target storage.

21 Claims, 8 Drawing Sheets

CONTAINER REPLICATION AND FAILOVER ORCHESTRATION IN DISTRIBUTED COMPUTING ENVIRONMENTS

BACKGROUND OF THE INVENTION

Field of the Invention

The present invention relates in general computing systems, and more particularly to, various embodiments for replication and disaster recovery techniques within a distributed computing environment.

Description of the Related Art

In today's society, computer systems are commonplace. Computer systems may be found in the workplace, at home, or at school. As computer systems become increasingly relied upon, convenient, and portable, the Internet has grown exponentially. Now, more than ever before, individuals and businesses rely upon distributed storage systems (commonly referred to as "the cloud") to store information and data. As wide strides in technological advancement relating to data access devices have been accomplished, there is an ever-growing demand for growth and development within the back end supporting systems that provide and store the data content.

SUMMARY OF THE INVENTION

Various embodiments for managing volume replication and disaster recovery in a containerized storage environment are provided herein. In one embodiment, by way of example only, a method comprises (a) establishing a mapping between a PersistentVolumeClaim (PVC) having a correlated Persistent Volume (PV), and a source storage World Wide Name (WWN) and a target storage WWN; and (b) replicating the mapping as part of a replication operation between the source storage and the target storage thereby maintaining consistency of the PV associated with one or more application containers among the source storage and the target storage.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
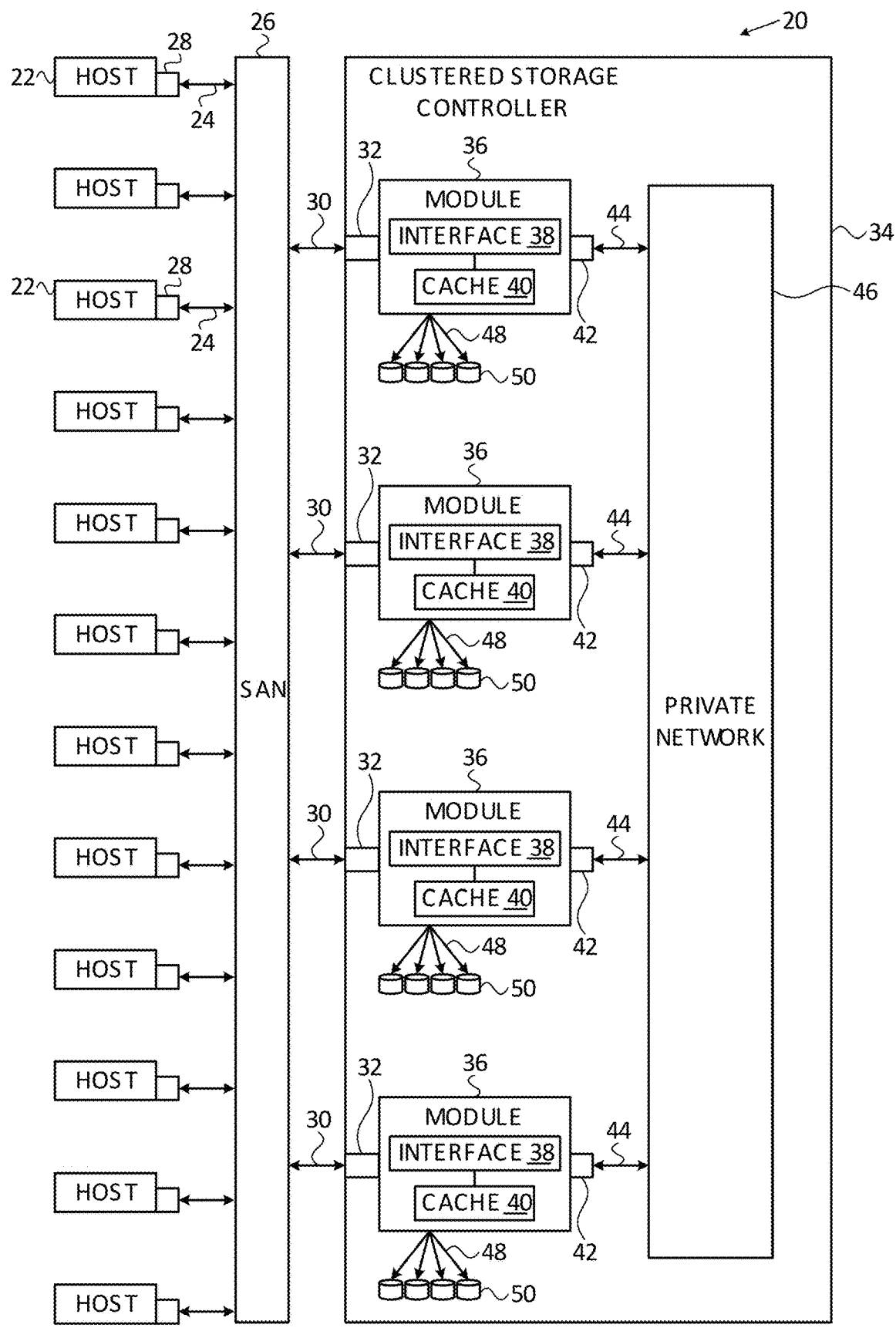
FIG. 1 illustrates a block diagram of a computer storage environment, in which aspects of the present invention may be realized.

A computing cluster, sometimes referred to as "cluster" for short, is a type of computer system which completes computing jobs by means of multiple collaborative computers (also known as computing resources such as software and/or hardware resources) which are connected together. These computing resources which are in a same management domain have a unified management policy and provide services to users as a whole. A single computer in a cluster system is usually called a node or a computing node.

Computing clusters often use techniques such as deploying application containers to execute various workloads and programs. Application "containerization" is an operating system level (OS-level) virtualization method for deploying and running distributed applications without launching an entire virtual machine (VM) for each application. Instead, multiple isolated systems are run on a single control host and access a single operating system kernel. The application containers hold the components such as files, libraries, and environment configuration necessary to run the desired software. Application containers place less strain on the overall computing resources available, as they share the operating system kernel, and may also share resources such as storage and networking.

Containerization may result in efficiency gains in memory, processing, and storage compared to traditional virtualization. Because application containers do not have the overhead required by VM's, it is possible to support many more containers on the same infrastructure. Application containers may also be migrated to other computing environments, such as computing systems, clouds, or other environments without requiring code changes. Accordingly, a potential benefit of application containers includes portability across various platforms.

Thus, application containers enable users to create, execute, isolate and scale applications in a light-weight, flexible and portable manner, and, as aforementioned, users can deploy these application containers in a variety of computing environments and/or on multiple computing devices. For example, a user may encapsulate a traditional host based application and its dependencies such as libraries, configuration files, entitlement information, etc. into one application container or a group of application containers. These containers can be deployed to a variety of contexts such as a private computing cluster or a public cloud.

Persistent storage and disaster recovery in container cluster infrastructure is one of the most interesting current problems in computing. As containers gain critical mass in enterprise deployments, solutions are needed to store a vast amount of containerized information in a way developers can depend on in any environment. That is, in a world of dynamic, rapidly iterated application containers, data consistency, durability, and resiliency must be assured to maintain high availability of the services deployed and the underlying stored data thereof. Accordingly, present invention details several aspects to improve volume replication and disaster recovery techniques for persistent storage to assure the data consistency and high availability of respective containerized applications in clustered storage environments. Embodiments (in no particular order of importance) to employ these mechanisms are summarized, following.

Volume Replication in Containers: There exist some solutions to maintain persistent volumes (PVs) for containers, all relying on storage-specific plugins that maintain the volume lifecycle and attach these volumes to the containers or their respective host. However, none of the common orchestration systems known in the art offer a solution to integrate and leverage volume replication for PVs associated with respective containers. This poses a problem for users that wish to implement their existing disaster recovery policy, primarily when using synchronous replication, which can be highly effective and cost-saving in case of storage system crash or connectivity failure. Ideally, volume replication should be used in order to keep applications (e.g., executing within containers) running even on connectivity or storage system failures, thereby delivering a better class of application high availability. Accordingly, aspects of the present disclosure implement functionality to maintain metadata of a mapping between a PersistentVolumeClaim (PVC) and its source and target storage WorldWideNames (WWNs), where, when PVs are replicated from the source storage to the target storage, this mapping is replicated as part of the replication operation. In this way, during storage failover, the container storage plugin can look up the relevant mapping in order to restart applications at the target system.

Disaster Recovery Between Container Clusters: Building a backup policy and disaster recovery plan is critical for all systems, and is considered imperative in storage architectures. This same principle holds true in containerized environments as much as for virtual machines or other cloud elements. Maintaining a backup & recovery procedure for container storage volumes is an integral part of this policy. Currently, some rudimentary backup and disaster recovery plans are available within certain container clusters, however these do not use storage replication and storage failover functionality. Accordingly, aspects of the present disclosure detail solutions that enable failover between clusters by leveraging volume replication. In addition to the PVC and its source and target storage WWNs, the metadata of the mapping further contains installation, deployment, and configuration scripts used to quickly restart a failed over application on-demand.

Automatic Volume Failover Upon Restart on a Different Site: Container orchestration systems support container restart on a different node in the cluster in case the originating system crashes. Generally, as part of this procedure, it is up to the container provisioner to implement a policy for detaching the particular used volume(s) on storage system from the source node, and re-attaching the volume to the target node. However, cluster nodes may be located far from each other (i.e., in physical distance), and this means that when the container is restarted on another node, latency to the storage system may change accordingly. Moreover, future orchestration systems may allow disaster recovery plans that include the ability to restart a container in a different cluster, which may have an even greater latency to the system containing the volume used for the application/container. Currently, while storage level replication is widely used for high availability and disaster recovery, it is currently not leveraged for containerized application failover. Accordingly, aspects of the present disclosure provide functionality to, upon container restart, determine a preferred storage system for the particular node and trigger a volume detach operation from its associated current node (subsequent to the restart) and re-attach the volume to a preferred node which is better optimized to provide lower latency.

Container Orchestration Support of HyperSwap Volumes: Current container orchestration systems are just starting to support persistent storage. Because of this, many high availability and disaster recovery capabilities are not yet handled. One of these advanced features not yet incorporated into the disaster recovery abilities is the "HyperSwap" volume. A HyperSwap volume comprises a volume which may be implemented as two volumes—both as a source and a target, and both with read/write abilities. As current orchestration flow goes, when provisioning a new volume, the new volume is attached and mapped to a single host. In order to support a HyperSwap volume, the orchestration system may need to change this procedure through a series of mapping and attachment actions. Accordingly, aspects of the present disclosure provide mechanisms to support HyperSwap volumes in existing container orchestration systems, and further, provide failover support to re-map these HyperSwap volumes to the appropriate host.

Turning now to FIG. 1, a schematic pictorial illustration of a data processing storage subsystem 20 is shown, in accordance with a disclosed embodiment of the invention. The particular subsystem shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host SAN adapters (HSAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally, or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While not explicitly shown for purposes of illustrative simplicity, the skilled artisan will appreciate that in some embodiments, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Figure 2:
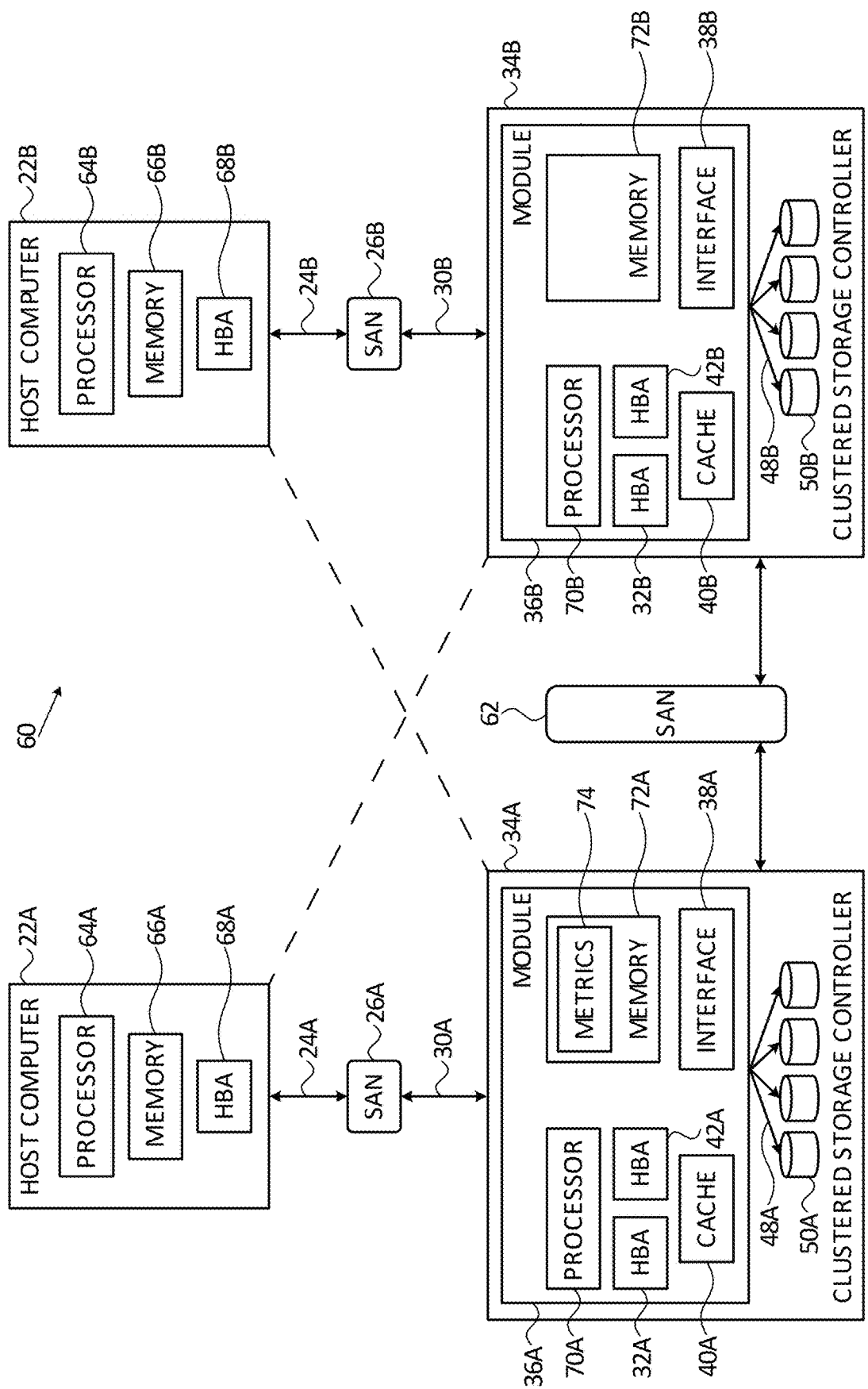
FIG. 2 illustrates a block diagram of a hardware structure of a data storage system, in which aspects of the present invention may be realized.

FIG. 2 is a schematic pictorial illustration of facility 100 configured to perform various replication and disaster recovery techniques, in accordance with embodiments of the present invention. In the description herein, host computers 22, storage controllers 34 and their respective components may be differentiated by appending a letter to the identifying numeral, so that facility 100 comprises a first host computer 22A (also referred to herein as a primary host computer) coupled to a clustered storage controller 34A via a SAN 26A, and a second host computer 22B (also referred to herein as a secondary host computer) coupled to a clustered storage controller 34B via a SAN 26B. In the configuration shown in FIG. 2 storage controllers 34A and 34B are coupled via a facility SAN 102. In other embodiments, as will be described herein, the first host computer 22A may be directly connected to the clustered storage controller 34B, and the second host computer 22B may be directly connected to the clustered storage controller 34A via a SAN similar to SAN 102, a virtualized networking connection, or any other computer implemented medium. The coupling of the clustered storage controller 34A and clustered storage controller 34B via SAN 102 enables the establishment of a variety of storage techniques including disaster recovery (DR) techniques. As will be further described herein, such coupling provides the back-end infrastructure needed for the establishment of data mirroring operations between the clustered storage controllers 34A/34B (and likewise between first host computer 22A and second host computer 22B interconnected between clustered storage controllers 34A/34B), or otherwise a host of related DR operations as commonly known in the art.

Host computer 22A comprises a processor 64A, a memory 66A, and an adapter 68A. Adapter 68A is coupled to SAN 26A via a data connection 24A.

As described supra, module 36A is coupled to storage devices 50A via data connections 48A, and comprises adapters 32A and 42A, a cache 40A, and an interface 38A. Module 36A also comprises a processor 70A and a memory 72A. As explained in detail hereinbelow, processor 70A is configured to establish metrics 114 that indicate a connectivity status of host computer 22A, and store the metrics to memory 72A. In some embodiments, processor 70A may store metrics 74 to storage devices 50A.

Host computer 22B comprises a processor 64B, a memory 66B, and an adapter 68B. Adapter 68B is coupled to SAN 26B via a data connection 24B.

As described supra, module 36B is coupled to storage devices 50B via data connections 48B, and comprises adapters 32B and 42B, a cache 40B, and an interface 38B. Module 36B also comprises a processor 70A and a memory 72B.

Processors 64A, 64B, 70A and 70B typically comprise general-purpose computers, which are programmed in software to carry out the functions described herein. The software may be downloaded to host computers 22A and 22B and modules 36A and 36B in electronic form, over a network, for example, or it may be provided on non-transitory tangible media, such as optical, magnetic or electronic memory media. Alternatively, some or all of the functions of the processors may be carried out by dedicated or programmable digital hardware components, or using a combination of hardware and software elements.

Examples of adapters 32A, 32B, 42A, 42B, 68A and 68B, include switched fabric adapters such as Fibre Channel (FC) adapters, Internet Small Computer System Interface (iSCSI) adapters, Fibre Channel over Ethernet (FCoE) adapters and Infiniband' adapters.

While the configuration shown in FIG. 2 shows storage host computers 22A and 22B coupled to storage controllers 34A and 34B via SANs 26A and 26B, other configurations are to be considered within the spirit and scope of the present invention. For example, host computers 22A and 22B can be coupled to a single storage controller 34 via a single SAN 26.

It is understood in advance that although this disclosure includes a detailed description on cloud computing, following, that implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes and storage systems (e.g. storage subsystem 20).

Figure 3:
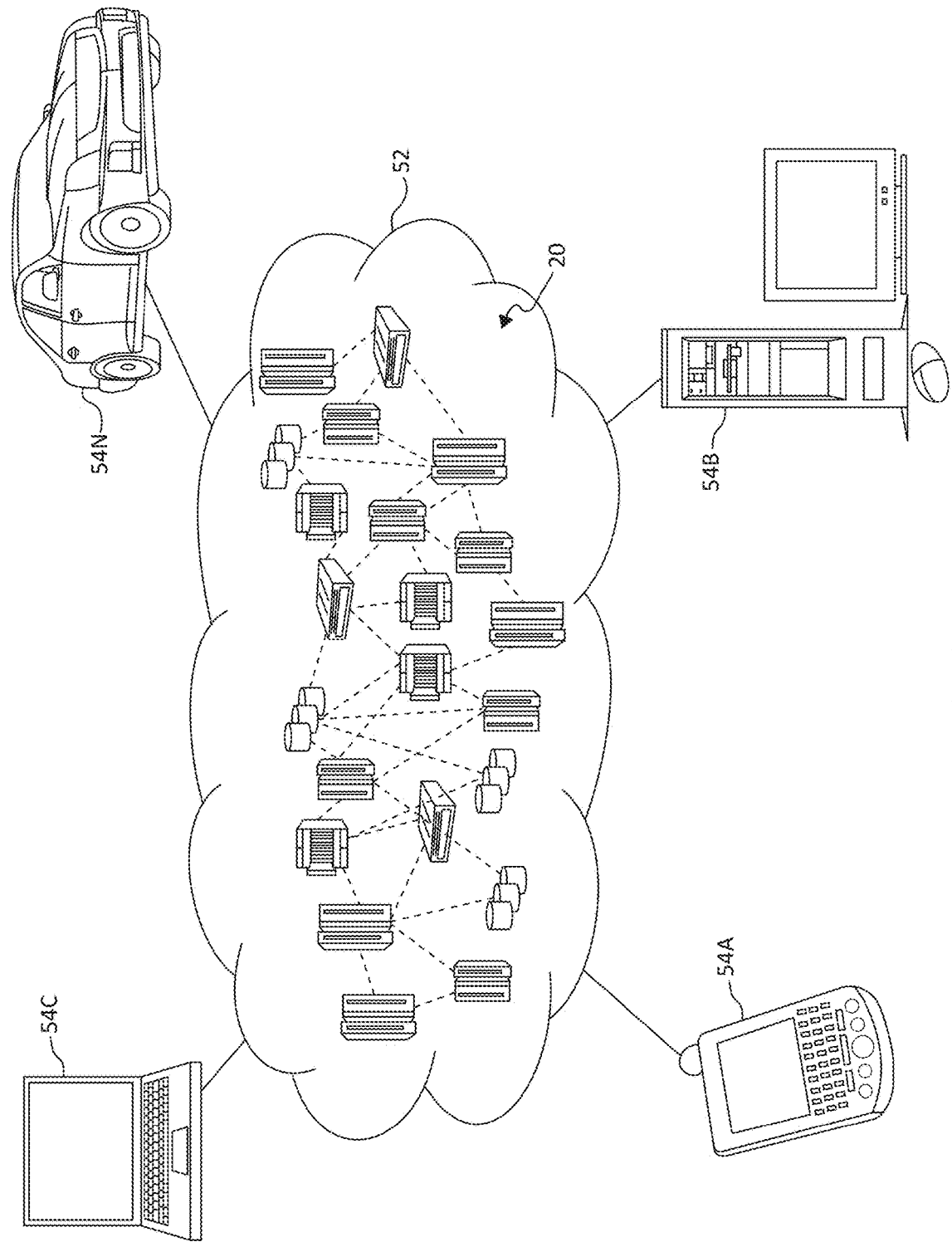
FIG. 3 illustrates a block diagram of an exemplary cloud computing environment, according to aspects of the present invention.

Referring now to FIG. 3, illustrative cloud computing environment 52 is depicted. As shown, cloud computing environment 52 comprises one or more storage subsystems 20 and cloud computing nodes with which local computing devices used by cloud consumers, such as, for example, personal digital assistant (PDA) or cellular telephone 54A, desktop computer 54B, laptop computer 54C, and/or automobile computer system 54N may communicate. Storage systems 20 and the cloud nodes may communicate with one another. They may be grouped (not shown) physically or virtually, in one or more networks, such as Private, Community, Public, or Hybrid clouds as described hereinabove, or a combination thereof. This allows cloud computing environment 52 to offer infrastructure, platforms and/or software as services for which a cloud consumer does not need to maintain resources on a local computing device. It is understood that the types of computing devices 54A-N shown in FIG. 3 are intended to be illustrative only and that storage subsystems 20, cloud computing nodes and cloud computing environment 52 can communicate with any type of computerized device over any type of network and/or network addressable connection (e.g., using a web browser).

Figure 4:
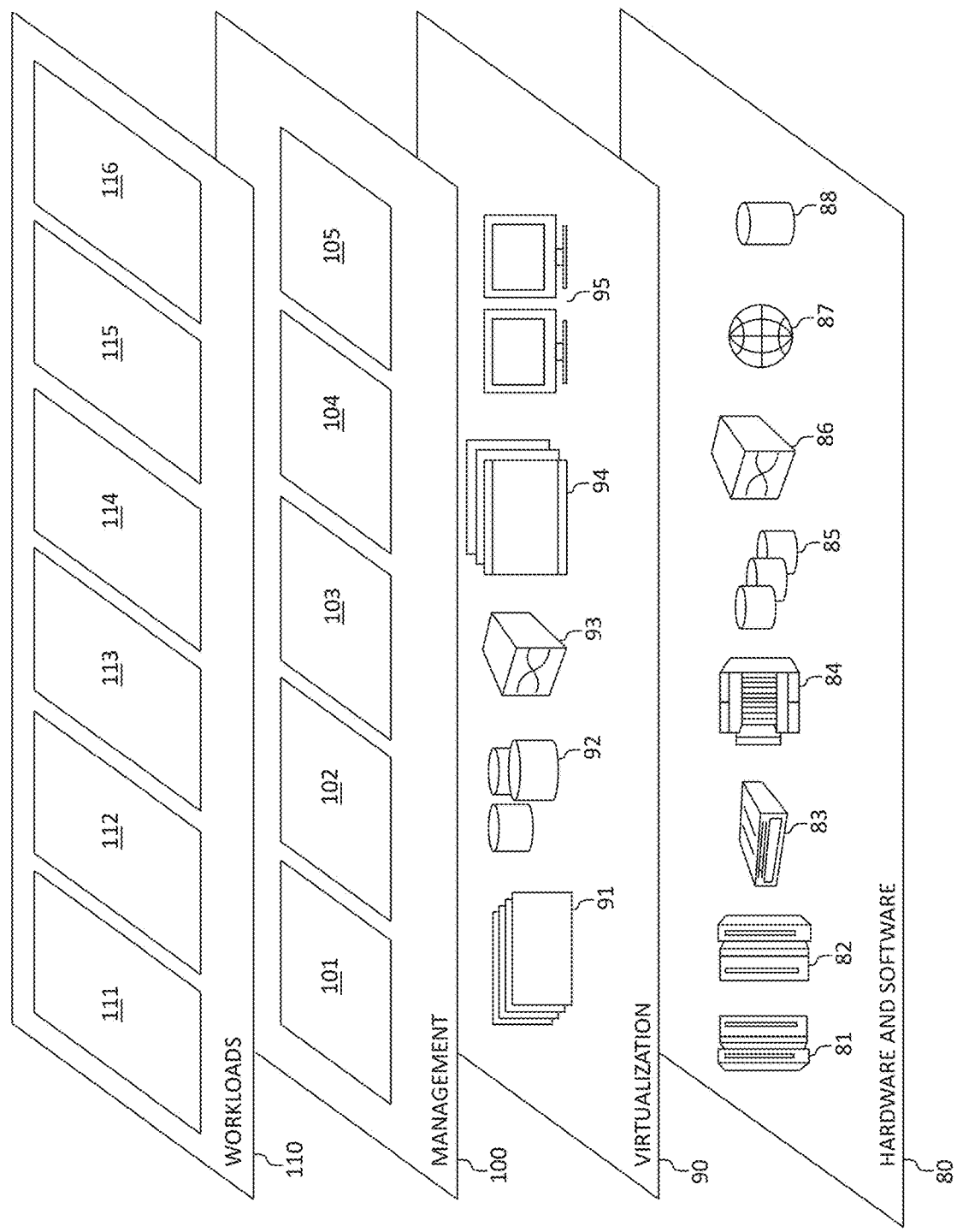
FIG. 4 illustrates a block diagram depicting abstraction model layers, according to aspects of the present invention.

Referring now to FIG. 4, a set of functional abstraction layers provided by cloud computing environment 52 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 80 includes hardware and software components. Examples of hardware components include: mainframes 81; RISC (Reduced Instruction Set Computer) architecture based servers 82; servers 83; blade servers 84; storage devices 85; and networks and networking components 86. In some embodiments, software components include network application server software 87 and database software 88.

Virtualization layer 90 provides an abstraction layer from which the following examples of virtual entities may be provided: virtual servers 91; virtual storage 92; virtual networks 93, including virtual private networks; virtual applications and operating systems 94; and virtual clients 95.

In one example, management layer 100 may provide the functions described below. Resource provisioning 101 provides dynamic procurement of computing resources and other resources that are utilized to perform tasks within the cloud computing environment. Metering and Pricing 102 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 103 provides access to the cloud computing environment for consumers and system administrators. Service level management 104 provides cloud computing resource allocation and management such that required service levels are met. Service Level Agreement (SLA) planning and fulfillment 105 provide pre-arrangement for, and procurement of, cloud computing resources for which a future requirement is anticipated in accordance with an SLA.

Workloads layer 110 provides examples of functionality for which the cloud computing environment may be utilized. Examples of workloads and functions which may be provided from this layer include: mapping and navigation 111; software development and lifecycle management 112; virtual classroom education delivery 113; data analytics processing 114; transaction processing 115; and, in the context of the illustrated embodiments of the present invention, various replication and disaster recovery functions 116. One of ordinary skill in the art will appreciate that the replication and disaster recovery functions 116 may also work in conjunction with other portions of the various abstractions layers, such as those in hardware and software 80, virtualization 90, management 100, and other workloads 110 (such as data analytics processing 114, for example) to accomplish the various purposes of the illustrated embodiments of the present invention.

Volume Replication and Container Orchestration Mechanism

Relying on storage system replication, a mapping between a PVC and its source and target WWNs will be stored in the source storage and replicated to the target storage. It should be noted that the source storage and target storage may comprise respective source and target volumes within respective hosts, nodes, storage systems, or clusters. Upon initiating a replication operation from the source storage to the target storage, the replicated data will include the mapping of the PVC to both the source WWN and the target WWN, such that on storage failover, the container storage plugin can retrieve the relevant WWN for the respective container/volume from the storage system. It should be noted that throughout the present disclosure, the terms "volume" and "persistent volume" may be used interchangeably to merely refer to a volume persistently assigned to a particular application container.

Figure 5:
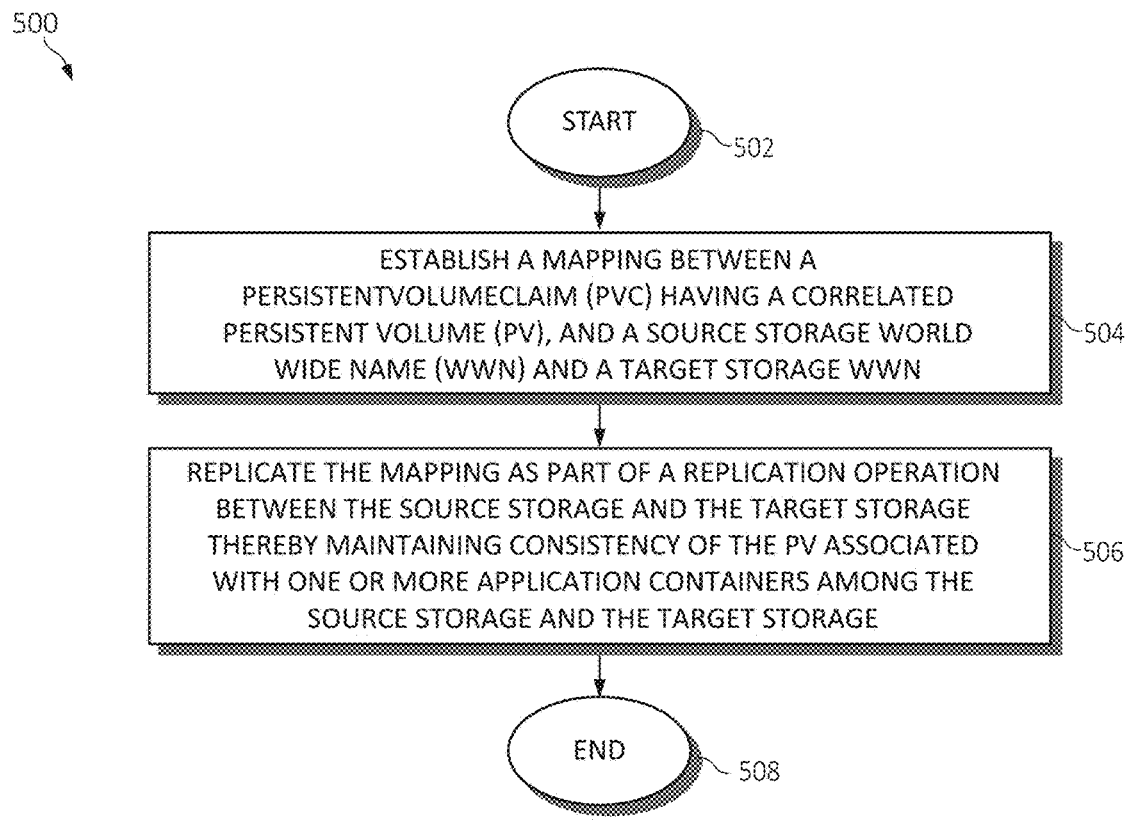
FIG. 5 illustrates a flow chart diagram illustrating a method for managing volume replication and disaster recovery in a containerized storage environment, in accordance with aspects of the present invention.

FIG. 5 illustrates a method 500 for managing volume replication and disaster recovery in a containerized storage environment, in accordance with one embodiment of the present invention. The method 500 (and all subsequent methods, such as method 600, method 700, etc.) may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 (and all subsequent methods, such as method 600, method 700, etc.) may be performed by any suitable component of the operating environment. For example, in various embodiments, the method 500 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

The method 500 begins (step 502) by establishing a mapping between a PVC having a correlated PV, and a source storage WWN and a target storage WWN (step 504). The mapping is replicated as part of a replication operation between the source storage and the target storage thereby maintaining consistency of the PV associated with one or more application containers among the source storage and the target storage (step 506). The method 500 ends (step 508).

As mentioned, in various embodiments, upon the establishment of the mapping between the PVC and the source/target WWNs, the mapping needs to be replicated to the target storage system. One option to replicate this mapping from the source storage to the target storage is to have each volume keep the PVC within the metadata stored on the volume itself. In this way, when the source volume is replicated according to a given storage policy, this mapping data is replicated to the target volume as well. Additionally or alternatively, a designated "metadata volume" may be maintained within the storage system. This designated metadata volume may keep mappings of each PVC to its source and target WWNs, and the metadata volume may be replicated (e.g., at certain intervals or according to the storage policy) to the target storage.

Figure 6:
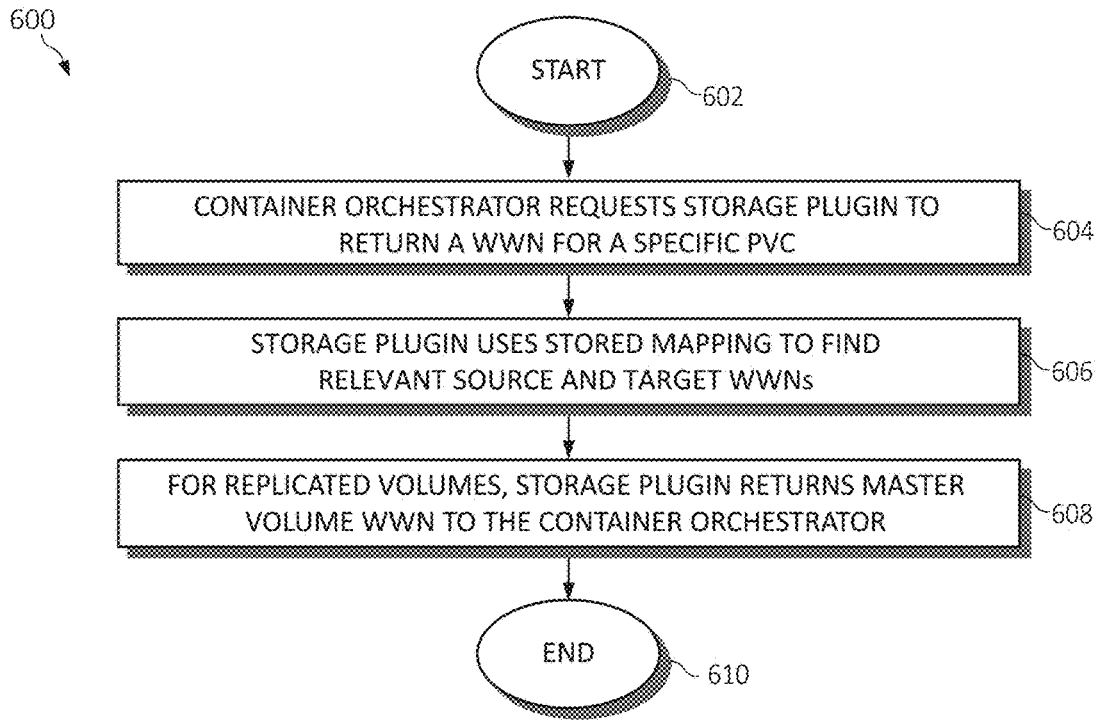
FIG. 6 illustrates an additional flow chart diagram illustrating a method for managing volume replication and disaster recovery in a containerized storage environment, in accordance with aspects of the present invention.

A container orchestrator may be used as commonly known in the art to facilitate the deployment and maintenance of respective application containers and their associated applications and volumes. Continuing to FIG. 6, an additional method 600 for managing volume replication and disaster recovery is illustrated. The method 600 begins at step 602. In operation, when the container orchestrator requests the container storage plugin to return a WWN for a specific PVC (step 604), the plugin should use the stored mapping in order to find the relevant source and target WWNs (step 606). This may be performed by using a single (replicated) volume that keeps all mappings, or by a volume-per-system technique that keeps only the mappings relevant to that system on an associated volume. For replicated volumes, the container storage plugin will return the master volume WWN to the container orchestrator (step 608). If the container orchestrator finds that the container is attached to a secondary volume instead, the container orchestrator initiates a detach/attach operation within the container storage plugin to thereby attach the master volume. The method 600 ends (step 610).

Storage Disaster Recovery Between Container Clusters

As mentioned, the replicated metadata of a given volume contains mapping data of the PVC to its source and target storage WWNs. In some embodiments, the replicated metadata also includes configuration files for its associated application/container. Thus, the metadata will include, among other required information, the mapping of the PVC (i.e., the container volume name) to both source and target storage WWNs. This will allow detachment of the volume on the source cluster and attachment of the volume on the target cluster. Additionally, however, the metadata may also include the installation, deployment and configuration scripts associated with its given application/container, such that the target cluster orchestration system will be able to start the application on demand.

In various embodiments and in operation, a source cluster will be attached to a source storage system, a target cluster will be attached to a target storage system. On building the recovery plan for a particular application, all containers relating to the application need to be included within the recovery plan, and their attached volumes need to be replicated to from the source storage system to the target storage system. It should be noted that an additional option exists for the source and target clusters both to be attached to a single storage system, without replication. This scenario will also be referred to hereinbelow. The storage system should have a volume which will include the following configuration data, for the target cluster to be able to run the application in case of source cluster failure:
  A Mapping of the PVC to the source and target systems' WWNs (or to a single WWN, in case both source and target clusters share the same storage system);
  Deployment (yaml) files;
  Configuration files; and
  Installation scripts.

Accordingly, the source cluster will have access to the source system data and the target cluster will have access to the target system data.

Planned Failover

Figure 7:
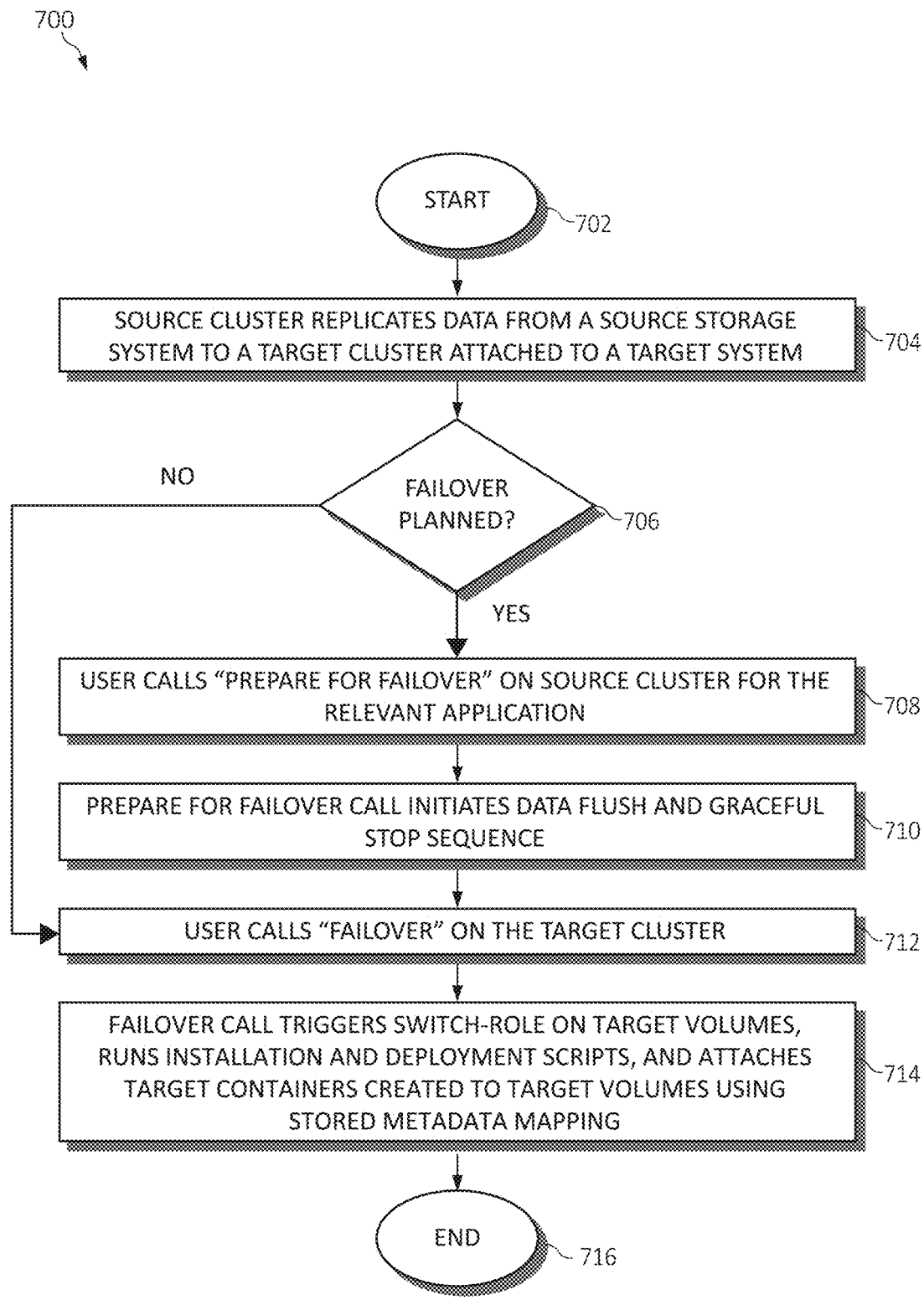
FIG. 7 illustrates a flow chart diagram illustrating a method for disaster recovery failover between container clusters, in accordance with aspects of the present invention.

Referring now to the method 700 for disaster recovery failover between container clusters of FIG. 7, the method 700 begins (step 702) by replicating source cluster data (including the volume containing the configuration metadata) from the source storage system to the target cluster attached to the target storage system (step 704). A determination is then made at step 706 as to whether an impending failover is a planned failover or an unplanned failover. On a planned failover, the user initiates and calls "prepare for failover" on the source cluster for the relevant application (step 708). This call will initiate a data flush of the applications and a graceful stop sequence, including a detach action of the application containers from their container volumes on the source storage system (step 710). Once the "prepare for failover" procedure is complete, the user then calls "failover" on the target cluster (step 712). This command will pass through the volume provisioner, triggering a switch-role on the target volumes thereby shifting responsibility of the master volume to the target storage system (in case two storage systems with replication are used), initiate running of the installation and deployment scripts, and attaching the target containers created to the target volumes by using the mapping in the volume metadata between the PVC and the target WWN (step 714). The method 700 then ends (step 716).

Unplanned Failover

Returning to step 706, on an unplanned failover, the user cannot reach the source cluster. Therefore, the user only calls the "failover" command on the target cluster (step 712). In this mode, the target storage system volume provisioner will force-detach the source container node from the source volumes, and only then attach the target node to them. The applications are then re-initiated using the installation and deployment scripts, and the target containers are attached to the target volumes subsequent to the force-detachment of the source container node (step 714). The method 700 again ends (step 716).

Automatic Volume Failover Upon Restart at a Different Site

As mentioned previously, upon container restart (due to a system crash, for example), the storage container provisioner may detach a used volume on the storage system from a source node and re-attach the volume to a different target node. In some cases, however, this target node may be located at a distance from the storage system which incurs an excessive amount of latency when transferring data between the container at the target node and the storage system when other node options provide a more efficient path.

Figure 8:
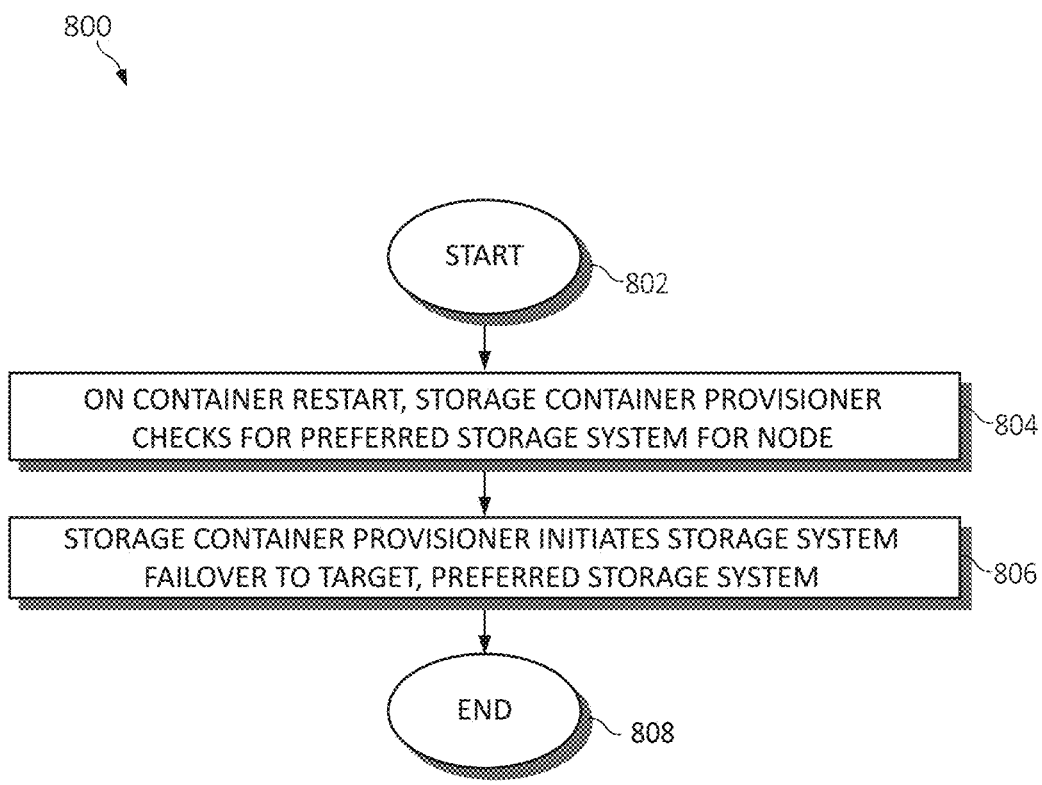
FIG. 8 illustrates a flow chart diagram illustrating a method for automatic volume failover upon container restart at a different site, in accordance with aspects of the present invention.

Accordingly, a method 800 for automatic volume failover may be employed as illustrated in FIG. 8 to adjust which storage system holds the volumes associated with the container for better (decreased) latency. The method 800 begins (step 802) by, responsive to a container restart, identifying by the storage container provisioner which storage system is preferred for this node (step 804). The storage container provisioner may also, when relevant, initiate a storage system volume failover to its target (preferred) storage system (e.g., using a switch-role or change-role procedure), and trigger a command to detach-source-volume-from-source-node/attach-target-volume-to-target-node for the restarted container (step 806). In other words, the storage container provisioner determines, by way of the metadata mapping held within the volume or other means, which storage system is the preferred storage system for the volumes associated with the particular (restarted) container, detaches the volumes from the originating node and re-attaches the volumes to the preferred node of the preferred storage system. The method 800 ends (step 808).

It should be noted that the method 800 is performed in a situation of the container restart occurring within the same cluster (e.g., the container is restarted on a different node within the same cluster). If the container is restarted between clusters (i.e., the container is restarted on a node in a different cluster), the target cluster provisioner may need to force-detach the source volume from the source node pursuant to attaching the volume within the preferred node of the preferred storage system.

Container Orchestration Support of Hyperswap Volumes

As mentioned, a HyperSwap volume comprises a volume which may be implemented as two volumes—both as a source and a target, and both with read/write abilities. In other words, HyperSwap volumes create copies on separate sites such that data that is written to a HyperSwap volume is automatically sent to both copies so that either site can provide access to the volume if the other site becomes unavailable.

When a HyperSwap volume is provisioned, the container orchestration system would need to map and attach the container to the HyperSwap volume which appears in both source and target storage systems. All the details as to how this is implemented should be transparent to the container orchestration system. As a major enhancement, a failover of containers to a different node could trigger the failover of the related HyperSwap volumes if relevant, in order to handle disaster recovery cases as well as to reduce latency. This process of course can work the other way around, where if a HyperSwap volume requires to failover, its related container will follow the volume and restart on a better node with improved latency.

Accordingly in various embodiments, on volume provisioning, HyperSwap indication will be added as needed in the deployment files. When the HyperSwap volume provisioning flow is triggered within the container orchestration system, the "map/attach" actions will map and attach the associated container to both source and target volumes. If a container is restarted on a different node such that the HyperSwap volume is failed over, the unmap/dettach functionality is performed for both paths (source and target volumes), and re-mapped/re-attached for the new node.

Figure 9A:
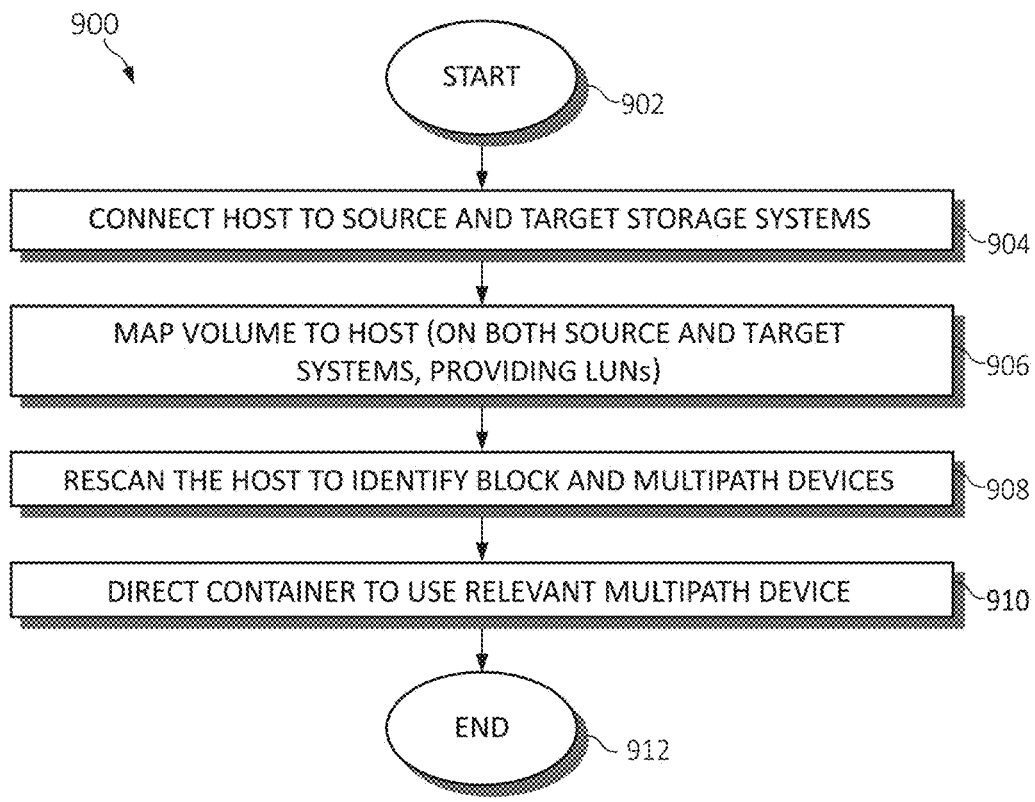
FIGS. 9A and 9B illustrate flow chart diagrams illustrating methods for container orchestration support of Hyper-Swap volumes, in accordance with aspects of the present invention.

FIG. 9A illustrates a method 900 for container orchestration support of HyperSwap volumes, including stages for connecting a HyperSwap volume to container (this order may vary from storage to storage). The method 900 begins (step 902) by connecting a host to both source and target storage systems (step 904), and mapping the container volume to the host (on both the source and target systems by, for example, providing Logical Unit Numbers (LUNs)) (step 906). The host is then rescanned to identify block and multipath devices (step 908), and once the multipath devices (HyperSwap volumes) are discovered, the container is directed by the container orchestrator to use the relevant multipath device for the container/volume (step 910). The method 900 ends (step 912).

Figure 9B:
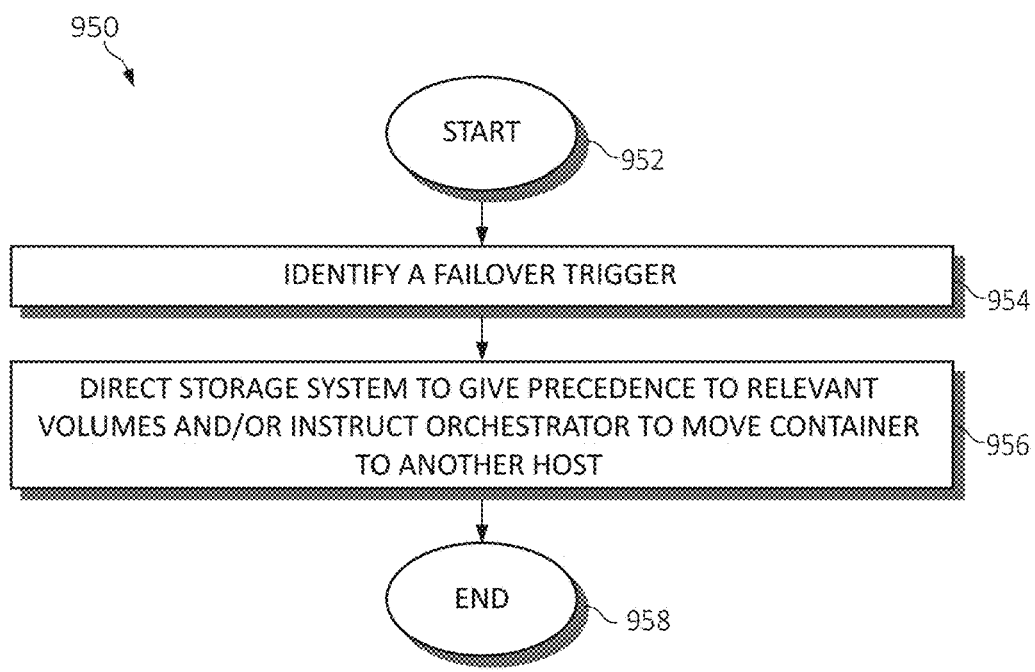

FIG. 9B illustrates a method 950 for container orchestration support of HyperSwap volumes, including an example failover scenario performed by the container orchestrator. The method 950 begins (step 952) by identifying a failover trigger (e.g., as initiated by a user, a system crash, etc.) (step 954). The storage system is then instructed, upon failover, to give precedence to the relevant storage volume to the container (e.g., a HyperSwap volume). Additionally and/or alternatively, the container orchestrator may be instructed (e.g., by a user or otherwise) to move the failed-over container to another host and to re-map the volumes thereof to the associated source and target storage (step 956). The method 950 ends (step 958).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for managing volume replication and disaster recovery in a containerized storage environment, by a processor, comprising:
   establishing a mapping between a PersistentVolumeClaim (PVC) having a correlated Persistent Volume (PV), and a source storage World Wide Name (WWN) and a target storage WWN; and
   replicating the mapping as part of a replication operation between the source storage and the target storage thereby maintaining consistency of the PV associated with one or more application containers among the source storage and the target storage.

2. The method of claim 1, wherein the replication operation further includes replicating the PV from the source storage to the target storage; wherein metadata stored within the PV includes at least one of the PVC, installation files, deployment files, and configuration scripts.

3. The method of claim 1, further including using a dedicated metadata volume to maintain the mapping of each of the PV, the dedicated metadata volume replicated with the PV from the source storage to the target storage as part of the replication operation.

4. The method of claim 1, further including using a container orchestrator to request a storage plugin to return one of the source storage WWN and the target storage WWN; wherein the storage plugin retrieves the mapping from the PV.

5. The method of claim 1, further including initiating a failover from the source storage to the target storage, the failover comprising one of a planned and an unplanned failover; wherein:
   the planned failover is initiated via at least one command received at the source storage and the target storage by a user, the planned failover using the mapping to re-initiate applications executing within the one or more application containers at the target storage; and
   the unplanned failover is initiated via the at least one command received at the target storage by the user, the unplanned failover force-detaching a source container node from the PV at the source storage and attaching a target container node to the PV at the target storage.

6. The method of claim 1, further including, upon a restart of one of the one or more application containers on a different node than the one of the one or more application containers was previously executing, triggering a preferred system failover to failover executing the one of the one or more application containers from the source storage comprising the different node to the target storage comprising a preferred node.

7. The method of claim 6, wherein the PV comprises a HyperSwap volume, and further including, responsive to the restarting, using the mapping to detach the HyperSwap volume from both the source storage and the target storage and subsequently attach the HyperSwap volume to both the source storage and target storage of a new node.

8. A system for managing volume replication and disaster recovery in a containerized storage environment, comprising:
a processor executing instructions stored in a memory device; wherein the processor:
establishes a mapping between a PersistentVolumeClaim (PVC) having a correlated Persistent Volume (PV), and a source storage World Wide Name (WWN) and a target storage WWN; and
replicates the mapping as part of a replication operation between the source storage and the target storage thereby maintaining consistency of the PV associated with one or more application containers among the source storage and the target storage.

9. The system of claim 8, wherein the replication operation further includes replicating the PV from the source storage to the target storage; wherein metadata stored within the PV includes at least one of the PVC, installation files, deployment files, and configuration scripts.

10. The system of claim 8, wherein the processor uses a dedicated metadata volume to maintain the mapping of each of the PV, the dedicated metadata volume replicated with the PV from the source storage to the target storage as part of the replication operation.

11. The system of claim 8, wherein the processor uses a container orchestrator to request a storage plugin to return one of the source storage WWN and the target storage WWN; wherein the storage plugin retrieves the mapping from the PV.

12. The system of claim 8, wherein the processor initiates a failover from the source storage to the target storage, the failover comprising one of a planned and an unplanned failover; wherein:
the planned failover is initiated via at least one command received at the source storage and the target storage by a user, the planned failover using the mapping to re-initiate applications executing within the one or more application containers at the target storage; and
the unplanned failover is initiated via the at least one command received at the target storage by the user, the unplanned failover force-detaching a source container node from the PV at the source storage and attaching a target container node to the PV at the target storage.

13. The system of claim 8, wherein the processor, upon a restart of one of one or more application containers on a different node than the one of the one or more application containers was previously executing, triggers a preferred system failover to failover executing the one of the one or more application containers from the source storage comprising the different node to the target storage comprising a preferred node.

14. The system of claim 13, wherein the PV comprises a HyperSwap volume, and wherein the processor, responsive to the restarting, uses the mapping to detach the HyperSwap volume from both the source storage and the target storage and subsequently attach the HyperSwap volume to both the source storage and target storage of a new node.

15. A computer program product for managing volume replication and disaster recovery in a containerized storage environment, by a processor, the computer program product embodied on a non-transitory computer-readable storage medium having computer-readable program code portions stored therein, the computer-readable program code portions comprising:
an executable portion that establishes a mapping between a PersistentVolumeClaim (PVC) having a correlated Persistent Volume (PV), and a source storage World Wide Name (WWN) and a target storage WWN; and
an executable portion that replicates the mapping as part of a replication operation between the source storage and the target storage thereby maintaining consistency of the PV associated with one or more application containers among the source storage and the target storage.

16. The computer program product of claim 15, wherein the replication operation further includes replicating the PV from the source storage to the target storage; wherein metadata stored within the PV includes at least one of the PVC, installation files, deployment files, and configuration scripts.

17. The computer program product of claim 15, further including an executable portion that uses a dedicated metadata volume to maintain the mapping of the PV, the dedicated metadata volume replicated with the PV from the source storage to the target storage as part of the replication operation.

18. The computer program product of claim 15, further including an executable portion that uses a container orchestrator to request a storage plugin to return one of the source storage WWN and the target storage WWN; wherein the storage plugin retrieves the mapping from the PV.

19. The computer program product of claim 15, further including an executable portion that initiates a failover from the source storage to the target storage, the failover comprising one of a planned and an unplanned failover; wherein:
the planned failover is initiated via at least one command received at the source storage and the target storage by a user, the planned failover using the mapping to re-initiate applications executing within the one or more application containers at the target storage; and
the unplanned failover is initiated via the at least one command received at the target storage by the user, the unplanned failover force-detaching a source container node from the PV at the source storage and attaching a target container node to the PV at the target storage.

20. The computer program product of claim 15, further including an executable portion that, upon a restart of one of the one or more application containers on a different node than the one of the one or more application containers was previously executing, triggers a preferred system failover to failover executing the one of the one or more application containers from the source storage comprising the different node to the target storage comprising a preferred node.

21. The computer program product of claim 20, wherein the PV comprises a HyperSwap volume, and further including an executable portion that, responsive to the restarting, uses the mapping to detach the HyperSwap volume from both the source storage and the target storage and subsequently attach the HyperSwap volume to both the source storage and target storage of a new node.

* * * * *